Figure 1:
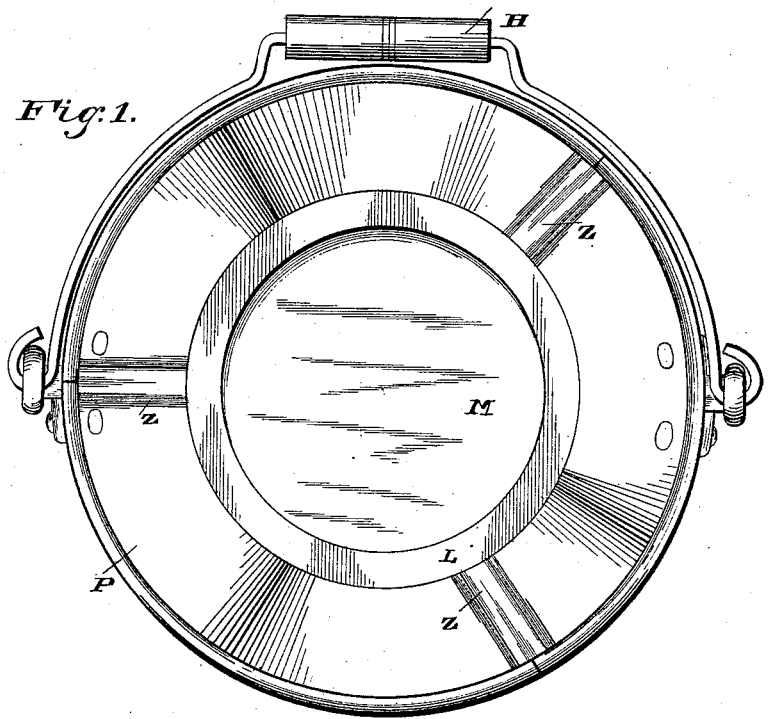

(No Model.)

E. G. WEST.
METALLIC VESSEL SEAM.

No. 469,761.          Patented Mar. 1, 1892.

Witnesses

Inventor
Elbridge G. West.
By his Attorneys,

UNITED STATES PATENT OFFICE.

ELBRIDGE G. WEST, OF CANANDAIGUA, NEW YORK, ASSIGNOR OF ONE-HALF TO ALASCO C. ROBISON, OF SAME PLACE.

METALLIC-VESSEL SEAM.

SPECIFICATION forming part of Letters Patent No. 469,761, dated March 1, 1892.

Application filed August 30, 1890. Serial No. 363,470. (No model.)

*To all whom it may concern:*

Be it known that I, ELBRIDGE G. WEST, a citizen of the United States, residing at Canandaigua, in the county of Ontario and State of New York, have invented a new and useful Metallic-Vessel Seam, of which the following is a specification.

This invention relates to metallic packing and storing vessels, and more especially to the seams therein; and the object of the same is to close the seams of metallic vessels, and especially tin vessels, by strips of zinc or other non-corrosive metal, in order to prevent the access of liquid to the sheet-iron forming the body of the tin where its edges are exposed in the seams.

To this end the invention consists of the specific details of construction hereinafter more fully described and claimed, and as illustrated in the drawings, in which—

Figure 2:
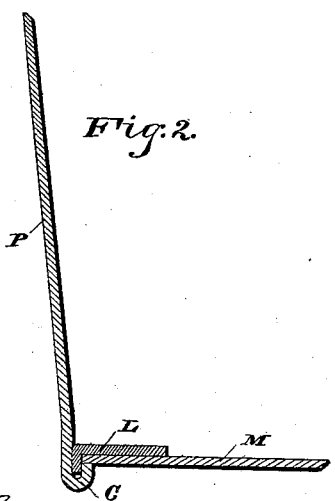

Figure 1 is a plan view of a tin pail embodying my invention. Fig. 2 is an enlarged cross-section through the chine of the pail.

Referring to the said drawings, the letter P designates a pail composed of ordinary tin—*i. e.*, sheet-iron plated with tin on both faces—and this pail may have an ordinary handle H and may be of any desired construction. Heretofore much difficulty has been experienced in metallic vessels of this character, owing to the fact that where the seams between the sheets of tin occurred there was more or less exposure of the edges of the sheet-iron to liquids which were placed within the vessel, resulting in the rapid rusting of such edges of the sheet-iron, which was soon communicated to the tin-plating, and not only were the liquids thereby rendered foul, but the vessel itself was soon caused to leak at the seams. One very common method of overcoming this objection was by adding solder to the seams where the two edges of metal were crimped or bent into each other, which solder more or less effectively covered the raw edges of the sheet-iron and prevented the same from becoming moistened and rusted; but the well-known objections to the use of solder containing more or less lead are that it communicates poison to liquids standing against it for some time, as well as that it is liable to be melted when the vessel is placed on a stove and the liquid therein is boiled out. In order to overcome these several objections, various means have been employed and various forms of seams have been used in vessels of this character. In the present case I prevent the access of liquid to the edge of the sheet-iron by means of strips of zinc applied to the seams in the manner described below.

The seams in the sides of the pail P, as illustrated in the drawings, or, in fact, seams between the edges of any two pieces of tin standing approximately in the same plane, are each covered by a strip of zinc Z. The seam is pressed, pounded, or rolled to press the parts tightly together, and solder may or may not be used under the strip of zinc Z, as preferred. The seams in the chines of pails such as is illustrated in the drawings, or, in fact, seams between the edges of any two pieces of tin standing in planes approximately at right angles to each other, are best seen in Fig. 2. The edge of one sheet of tin (in the present case the body of the pail) is turned up on the inner face of the sheet, forming the chine C, and the bottom M of the pail is a simple disk of tin of a size to fit within the body just above the upper extremity of the turned-up edge C. A strip of zinc L of L-shaped cross-section is also used in this class to close the seam. The body of this strip is soldered upon the upper face of the bottom M, around its edge, and the depending flange of the strip is seated behind the upturned edge C, this edge being pressed, pounded, or rolled to press the parts tightly together and form a stiff and durable chine, and solder may or may not be used therein, as preferred. It will be seen that a pail whose side and chine seams are thus formed presents no opportunity for the liquid to gain access to the raw edges of sheet-iron forming the body of the tin, and hence no rusting thereof is possible.

I have described zinc as the material of which the binding-strips are composed; but I desire to be understood as including in that term other non-corrosive metals having sufficient stiffness to prevent their straightening out in the rough usage of the vessel. I prefer, however, to use zinc or an alloy of which zinc is a prominent element for these strips.

What is claimed as new is—

In a sheet-metal vessel, the chine C, consisting of the body, whose lower edge is turned back on the inside of the vessel, a separate strip of non-corrosive metal of L-shaped cross-section, whose depending flange is seated behind said turned-back edge, and a bottom soldered to the lower side of the body of said strip, substantially as hereinbefore set forth.

In testimony that I claim the foregoing as my own I have hereto affixed my signature in presence of two witnesses.

ELBRIDGE G. WEST.

Witnesses:
J. H. BLODGETT,
CHARLES M. CLARK.